April 13, 1937.  E. O. RHODES ET AL  2,076,591
APPARATUS FOR DETERMINING THE CONSISTENCY OF MATERIALS
Filed June 24, 1935  2 Sheets-Sheet 2
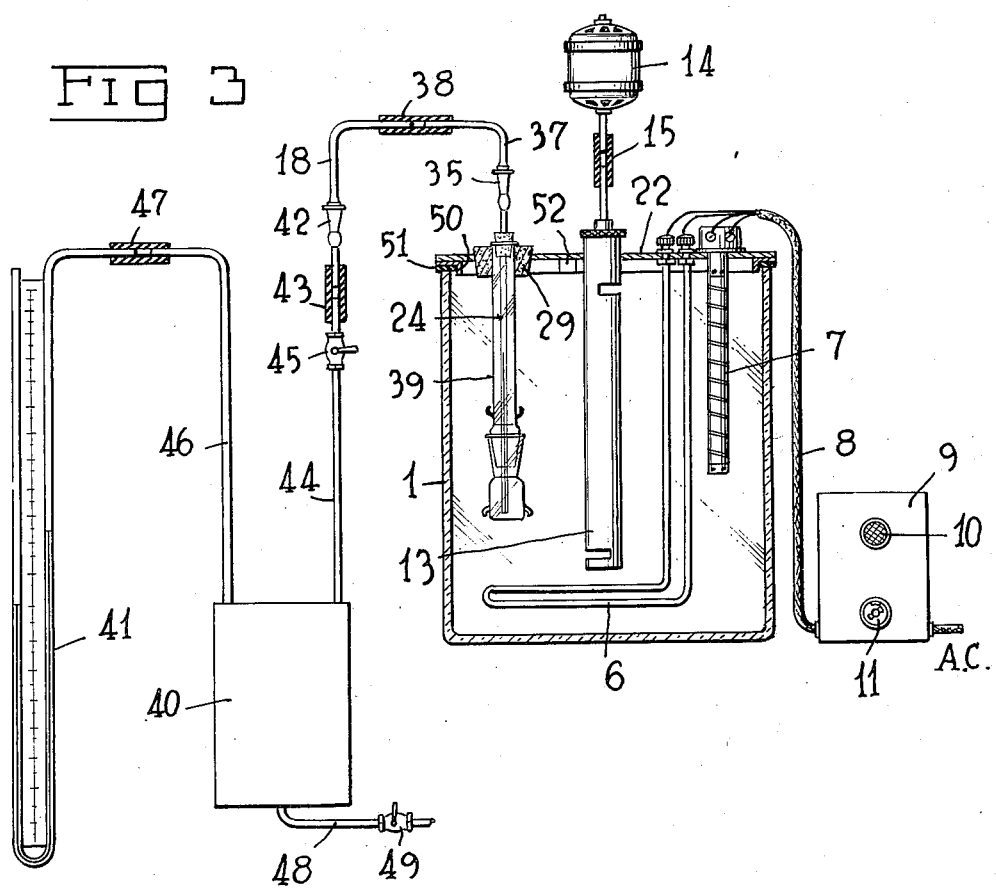
Fig 3
Fig 4
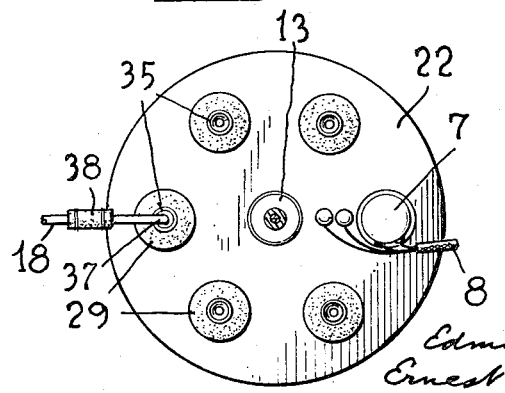
Inventors:
Edmund O. Rhodes
Ernest W. Volkmann
Charles T. Barker
By Frank H. Wisch  Attorney Patented Apr. 13, 1937

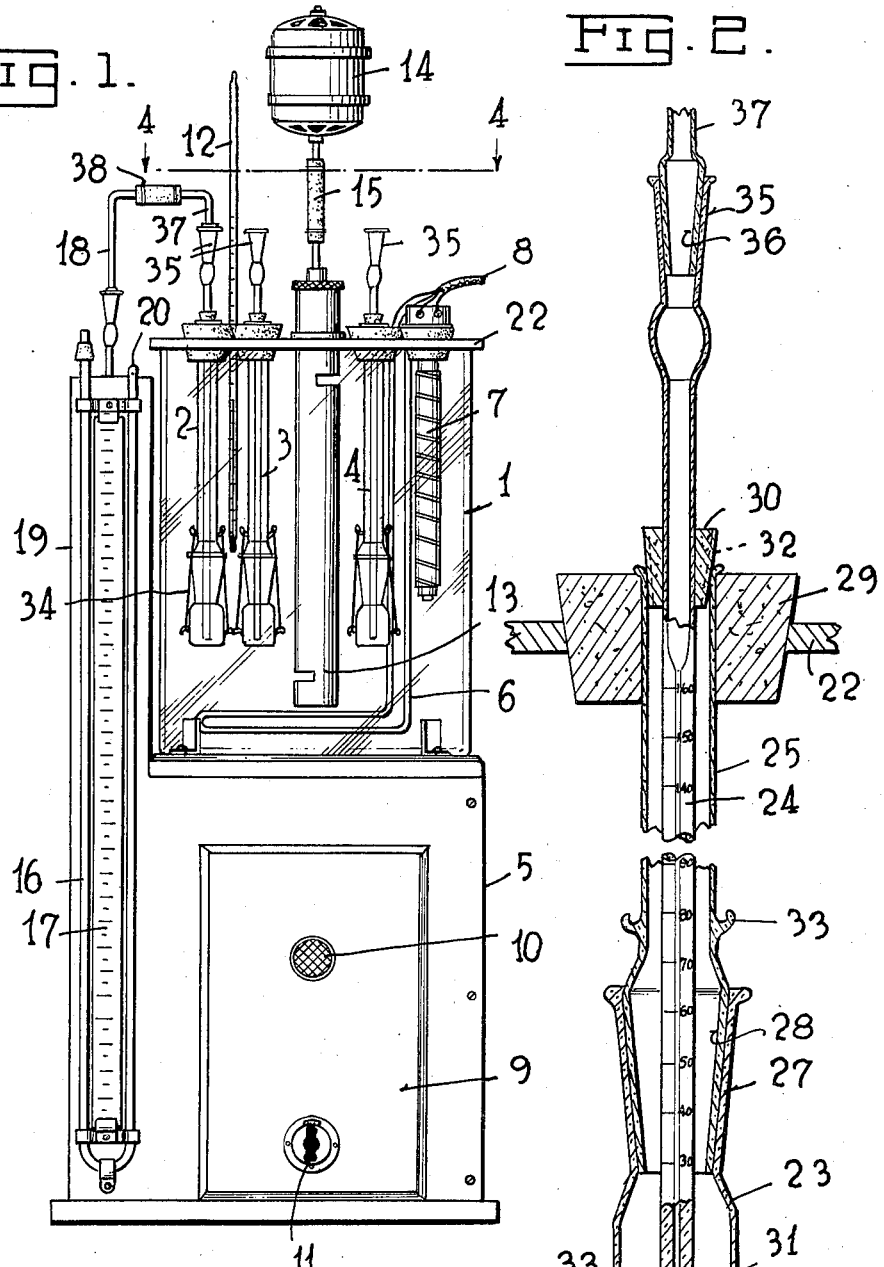

2,076,591

UNITED STATES PATENT OFFICE 2,076,591

APPARATUS FOR DETERMINING THE CONSISTENCY OF MATERIALS

Edmund O. Rhodes, and Ernest W. Volkmann, Pittsburgh, and Charles T. Barker, Mount Lebanon, Pa., assignors, by mesne assignments, to Koppers Company, a corporation of Delaware Application June 24, 1935, Serial No. 28,218

3 Claims. (Cl. 265—11)

This invention relates to means for determining the consistency of liquid or fluid materials. More particularly the invention relates to means for determining the consistency of bituminous materials or more particularly bituminous materials employed in the construction or maintenance of roads.

Heretofore various types of viscosimeters and various tests have been used for the determination of consistency. Certain of these tests are suitable for the determination of consistencies in only the lower ranges, others are suitable for the determination of consistencies in only the higher ranges. Furthermore various tests in use give results in empirical units and each is carried out under different conditions varying to such an extent that comparisons of materials tested by the different methods are difficult to make.

An object of the present invention is to provide an accurate apparatus for determining consistencies over a wide range. A further object is to provide a unitary means for carrying out the said test, and suitable for instance in the determination of consistency of all common grades of bituminous road materials that are flowable and form a meniscus.

With the instrument of the present invention, viscosities are determined by timing the flow of the material tested, through a tube. One end of the tube is immersed in the material under test and suction is applied to the other end to draw the material upwardly through the tube. The time required for the air-liquid interface to travel a given distance in the tube is noted. From the time required, the vacuum applied, the distance travelled by the air-liquid interface, and the radius of the bore of the tube, the viscosity of the material under test may be readily calculated.

By way of illustrating a preferred arrangement of apparatus to be employed in the present invention, reference is made to the accompanying drawings in which, Fig. 1 is a front view of the viscosimeter;

Fig. 2 is a longitudinal central sectional view of a testing unit employed in the apparatus shown in Fig. 1;

Fig. 3 is an elevational view partly in section of the apparatus, illustrating one manner of arranging various parts and the connections between them; and Fig. 4 is a view of Fig. 1 on line 4—4 in the direction of the arrows and illustrating an arrangement of the testing units.

Referring to Fig. 1 the apparatus shown comprises a vessel 1 for a constant temperature bath, and a plurality of testing units 2, 3 and 4 supported in the vessel 1. The vessel is positioned on a suitable housing structure 5 for portions of the apparatus referred to below.

Supported in the vessel 1 is a heating unit 6 for heating the bath which is any suitable transparent fluid. If desired, the unit 6 may be a cooling means in case viscosities of materials at temperatures lower than atmospheric are to be determined. A thermostat 7 is provided for the bath to control the supply of the heating or cooling medium in the unit 6. If electrical heating is employed the heating unit and the thermostat 7 are provided with suitable lead wires, designated by the numeral 8, which extend into the housing 5 to a relay mounted behind the panel 9, provided with a light 10 and a switch 11. The thermostat is preferably of a type capable of maintaining a set temperature within as small a variation as possible. A thermometer 12 is suspended in the bath for observing the temperature thereof.

A stirring means is provided to maintain a uniform temperature throughout the bath. The stirring means 13 is the well-known turbine type of stirrer and is preferably mounted in the center of the bath. The shaft of the stirrer 13 is connected to the shaft of a suitably mounted motor 14 by means of a flexible connection 15 that reduces vibration.

Mounted on one side of the housing 5 adjacent the front thereof, is a manometer 16 provided with a suitable scale 17 for indicating the degree of vacuum applied to a testing unit. One of the testing units 2 (Fig. 1) is shown connected to tubing 18 which extends downwardly behind the panel 19 on which the manometer 16 is mounted and is connected to a vacuum reservoir situated within the housing 5. One end 20 of the manometer tubing is connected to a tube that extends downwardly behind the panel 19 and is also connected to the above-mentioned reservoir. A valve is provided in the line 18 within easy reach of the operator to control the vacuum applied to a testing unit. Various parts mentioned above and not shown in Fig. 1 will be described below in connection with Fig. 3.

Figure 2 illustrates the construction of a testing unit such as those shown in Fig. 1 supported from the cover plate 22 on the vessel 1. A testing unit comprises a container 23 for a sample to be tested, and a tube 24. The container 23 and a tubular element 25 together form a casing member which incases the tube 24. The tubular element 25 and the mouth of the container 23 are joined by means of a watertight joint. If the container 23 and the tubular element 25 are constructed of glass, the mouth of the container 23 and the lower end of the tube 25 may form a ground glass joint, the mouth of the container 23 being the female part 27 of a tapered joint and the end of the tube 25 being the male part 28 of the joint properly tapered to make a close fit.

The container 23, the tube 24 and the tubular element 25 are constructed in whole or in part of transparent material such as glass so that the rise of the material tested may be visible in at least a part of the tube 24. The tube 24 is visible through the side of the vessel 1 which is constructed of glass.

The cover plate 22 is provided with circular openings into which one-hole rubber stoppers 29 may be fitted. The tubular element 25 passes through a stopper 29 which holds the testing unit in place in the bath. The tube 24 passes through a rubber stopper 30 which fits into the upper end of the tubular element 25 and holds the tube 24 in place with its lower open end 31 raised slightly above the bottom of the container 23. The stopper 30 is provided with one or more channels 32 in its side so that the interior of the container 23 may be accessible to the atmosphere.

A plurality of hooks 33 are provided on the outside of the tubular element 25 and on the outside of the container 23. Rubber bands 34 (Fig. 1) or other suitable means may be stretched over these hooks to maintain a tight joint in the casing member. By means of this joint the container member 23 is easily and quickly removable for cleaning purposes and for introduction of samples.

The tube 24 is a capillary tube provided with a bore that is preferably uniform in diameter. Tubes having a bore of larger diameter may be used depending upon the consistency of the material to be tested. If desired, for thick, extremely viscous, or semi solid substances, a tube of larger diameter may be employed than in the case of testing thin, readily flowable liquids. A variation in the size of the tube may not be necessary, however, particularly where temperatures may be varied. Any suitable means may be provided to indicate distances along the tube 24. Markings may be provided on the tube to indicate a predetermined distance, or a millimeter scale may be provided as shown extending upwardly on the tube from zero to about 160 millimeters or more. The portion of the tube 24 on which measurements are made is preferably below the cover plate 22 so that it may be kept as near the temperature of the container 23 as possible.

An enlarged portion is provided at the upper end of the tube 24 including the female part 35 of a ground glass joint. The male part 36 of the joint is provided on the end of a tube 37, joined by means of a flexible connection 38 (Fig. 1) to the tube 18.

It will be noted that the cover plate 22 of the vessel 1 may be provided with any desired number of openings through which any number of testing units may be lowered as space will permit. In Fig. 4, five testing units are shown supported by the cover plate 22. The cover plate 22 is rotatable horizontally so that connection of the vacuum tank with any one of the testing units may be readily made by bringing the end 35 of a tube 24 in alignment with a downwardly projecting portion of the tube 37.

In Fig. 3 the connections between a testing unit 39, a vacuum reservoir 40, and a vacuum gage or manometer 41 are more completely illustrated. The parts of the testing unit 39 are similar to those shown in Figs. 1 and 2, and similar numerals are employed in Fig. 3 to designate similar parts. The tube 37 is shown connected to the upper end of the tube 24 in the testing unit 39. The tube 18 connected to the tube 37 by means of the flexible connection 38, is shown provided with a joint 42 similar to the joint between the ends of the tubes 37 and 24. A flexible connection 43 joins an upper portion of the tube 18 with a lower portion 44 which is connected to the vacuum reservoir 40. In the tube 44 is a hand operated valve 45 for controlling the vacuum applied to the tube 24. A tube 46 connected to the vacuum reservoir 40, is connected to the manometer 41 by means of a flexible connection 47. A third tube 48 provided with a valve 49 is connected to the vacuum reservoir 40, and leads to a vacuum pump not shown.

The vacuum tank 40 as well as the relay behind the panel 9 are positioned in the housing 5 (Fig. 1), as stated above, and the valves 45 and 49 are conveniently placed for the operator.

Details of the rotatable cover plate 22 for the vessel 1 are likewise more completely shown in Fig. 3. A brass ring 50 of angular cross section is fitted to the edge of the vessel 1 with rubber gaskets 51. The cover plate 22 turns on the ring 50. Lugs 52 attached to the plate, and fitted inside the ring 50, keep the plate 22 properly centered.

A test on a liquid or fluid material including for instance bituminous substances and more particularly road tars, may be conducted with the apparatus shown in the drawings, as follows: Approximately five cubic centimeters of the material to be tested are placed in the container 23 of a testing unit 2 and the assembled unit is placed in position as shown in Fig. 1 or Fig. 2.

Prior to commencing the test, the bath is brought to the desired predetermined temperature. The temperature may be at the temperature at which a given material is apt to be when in use, or at any temperature taken as standard. Temperatures are limited to some extent depending on the characteristics of the bath fluid. For convenience the temperature of 35° C. has been employed since this is the lowest temperature which could be maintained during warm summer months without providing means for cooling the bath. The temperature, 35° C., is particularly suitable in testing road tars since this approaches actual road conditions.

About twenty minutes is generally allowed for a sample to come to the temperature of the bath. In the meantime the vacuum reservoir 40 has been exhausted to an extent dependent upon the material to be tested. An experienced operator can readily decide on the vacuum required for a given material.

The vacuum is applied to the viscosimeter unit by opening the valve 45; the valve 49 being closed. The material under test, rises in the tube 24 and the time for the meniscus to travel a given distance in the tube is noted with a stop watch. The distance between two points selected on the tube 24 may be varied depending upon the viscosity of the material tested.

After the above test has been made, the valve 45 is shut and the vacuum adjusted, if necessary, in readiness for the next test. The viscosimeter unit just used may be removed for cleaning and the cover plate 22 rotated until the next unit is in position for test.

The following data are taken for each test:
H=vacuum applied.
$\Delta t$=time.
$\lambda$=length of capillary tube submerged in samples.
$l_1$=length of said tube filled with material under test at the start of the time interval.
$l_2$=length of said tube filled with material under test at the end of the time interval.
$\sigma$=specific gravity of material under test.

The following formula may be used for calculating viscosities from the above data:

$$\mu = \frac{g \times r^2 \times \sigma \times \Delta t}{8 \times \left\{ \left(\frac{H}{\rho}+\lambda\right) \times ln \frac{\left(\frac{H}{\rho}+\lambda\right)-l_1}{\left(\frac{H}{\rho}+\lambda\right)-l_2} - (l_2-l_1) \right\}}$$

where $r$=radius of the bore of the tube through which the material under test is drawn by the vacuum.
$g$=acceleration due to gravity.
$ln$=natural logarithm.

It has been found that consistencies of materials having viscosities within the range corresponding to less than 1.0 or substantially 0.1 to more than 100,000 poises, may be determined by means of the apparatus of the present invention.

By the present invention consistencies for all materials are expressed in absolute units (poises). Only a very small sample is required for a single test. Due to the small size of the sample required, and the compactness of the viscosimeter unit, accurate temperature control is obtained. The test may be speedily made. Data taken with the instrument, indicate a precision of approximately 1% in the lower ranges and a much greater precision in the higher ranges.

We claim:—

1. Apparatus for determining the consistency of meniscus-forming fluid materials, in which apparatus the said materials are made to rise in a tube and the rate of rise therein is observed; the said apparatus comprising in combination a vessel for a constant temperature bath, a rotatable cover plate for the said vessel the said cover plate being provided with one or more openings each adapted to receive a testing unit, the said testing unit extending into the said vessel and being rotatable with the said cover plate and comprising a tube having connected to its end within the vessel a container for material to be tested, a testing tube within the first-named tube and extending into the container, means for selectively connecting a testing tube upon rotation of the said cover plate to suction means, the said suction means including a vacuum reservoir, means for determining the degree of vacuum, and means indicating distance along the length of a testing tube whereby the rate of rise of material in the said testing tube at a given vacuum is observed.

2. In apparatus for determining the consistency of meniscus-forming fluid materials, a transparent tube adapted to be placed in a constant temperature bath, a container connected to an end of the said tube, a leak-proof joint between the container and the said end of the said tube, a second transparent tube within the said first-named tube and extending through the said first-named tube into the said container, the said second tube being provided with an opening adjacent the bottom of the said container, and the said second tube being adapted to conduct the said fluid materials from the said container and being provided with a marked portion to indicate distances of travel of the said fluid material.

3. In apparatus for determining the consistency of meniscus-forming fluid materials, a transparent tube adapted to be placed in a constant temperature bath, a container connected to an end of the said tube, a leakproof joint between the container and the said end of the said tube, attaching means on the container and the said tube for maintaining the said joint closed, a second transparent tube axially supported in the said first-named tube, and extending through the said first-named tube into the said container, an open end of the said second tube being adjacent the bottom of the said container, the said second tube being adapted to conduct the said fluid materials from the said container and being provided with a marked portion to indicate distances of travel of the said fluid material.

EDMUND O. RHODES.
ERNEST W. VOLKMANN.
CHARLES T. BARKER.